(12) United States Patent
Liu

(10) Patent No.: US 6,493,114 B1
(45) Date of Patent: Dec. 10, 2002

(54) ADAPTIVE TIMING CONTROL OF LIGHT INTEGRATION PROCESS IN ONE-DIMENSIONAL CMOS IMAGE SENSORS

(75) Inventor: Dongtai Liu, Fremont, CA (US)

(73) Assignee: Syscan Technology (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 09/177,452

(22) Filed: Oct. 22, 1998

(51) Int. Cl.[7] .................................................. H04N 1/04
(52) U.S. Cl. ........................................ 358/509; 382/317
(58) Field of Search ............................... 382/317, 312; 358/474, 492, 509, 510, 513

(56) References Cited

U.S. PATENT DOCUMENTS

| | | | |
|---|---|---|---|
| 4,847,484 A | * | 7/1989 | Kikuchi .................. 250/221 |
| 4,930,008 A | * | 5/1990 | Suzuki ..................... 358/75 |
| 5,600,116 A | * | 2/1997 | Seo ......................... 235/455 |
| 5,908,294 A | * | 6/1999 | Schick ..................... 433/29 |
| 5,914,486 A | * | 6/1999 | Yamamoto ................ 25/226 |
| 5,936,767 A | * | 8/1999 | Favalora .................. 359/462 |
| 6,025,584 A | * | 2/2000 | Yamda ..................... 250/205 |

* cited by examiner

Primary Examiner—Jerome Grant, II
Assistant Examiner—Negussie Worku
(74) Attorney, Agent, or Firm—Joe Zheng

(57) ABSTRACT

An improved image sensing module disclosed herein has particular applications in imaging systems, such as image scanners, copy machines and facsimile machines, that optically convert an object to a signal or image before other processes can be proceeded. In one embodiment, the image sensing module employs a control signal circuitry that is integrated in an image sensor. The control signal circuitry receives a predetermined period for the light integration process of the image sensor and produces a sensor control signal that includes a time parameter that ensures that the light integration process lasts exactly for the predetermined time regardless how long an illumination source is kept on.

24 Claims, 10 Drawing Sheets

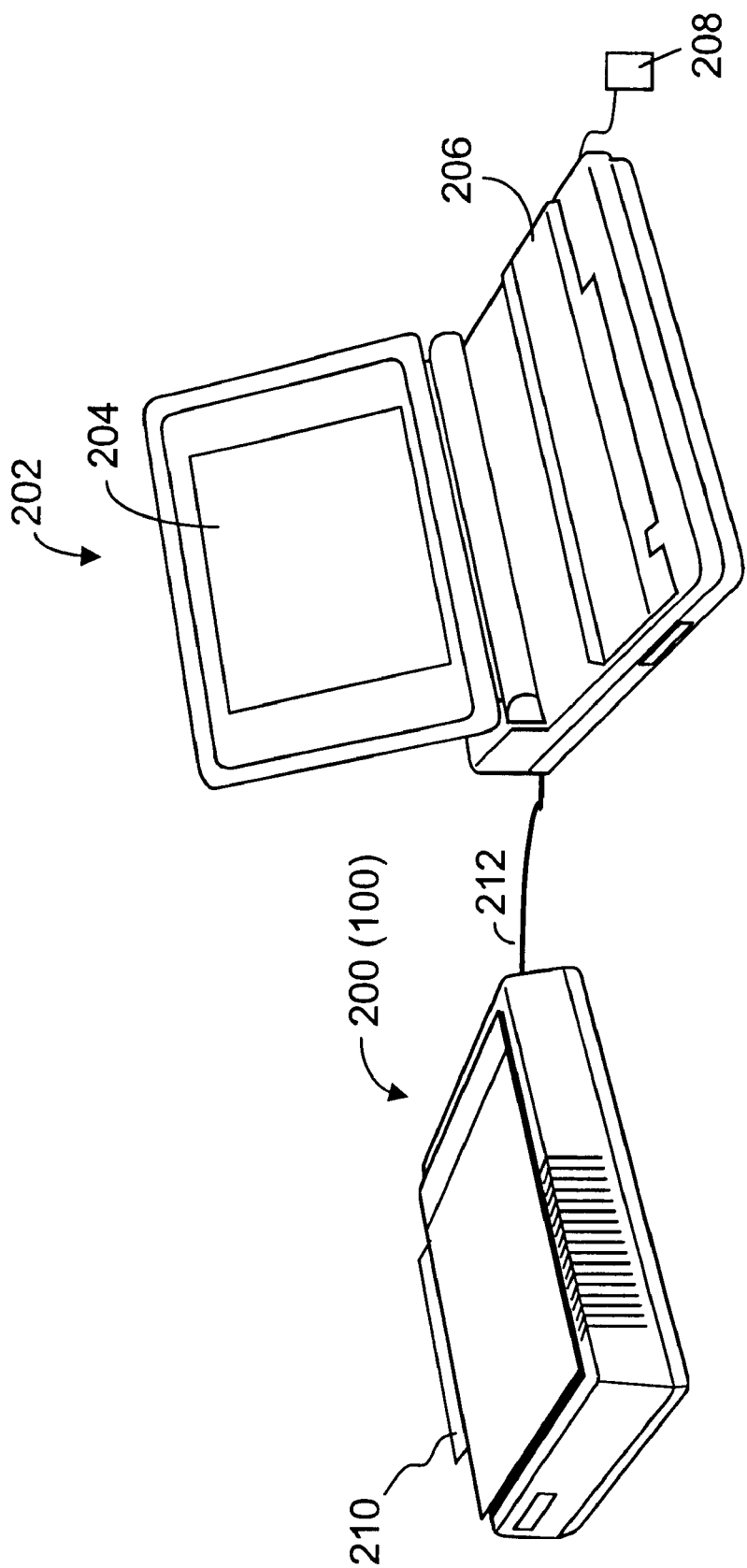

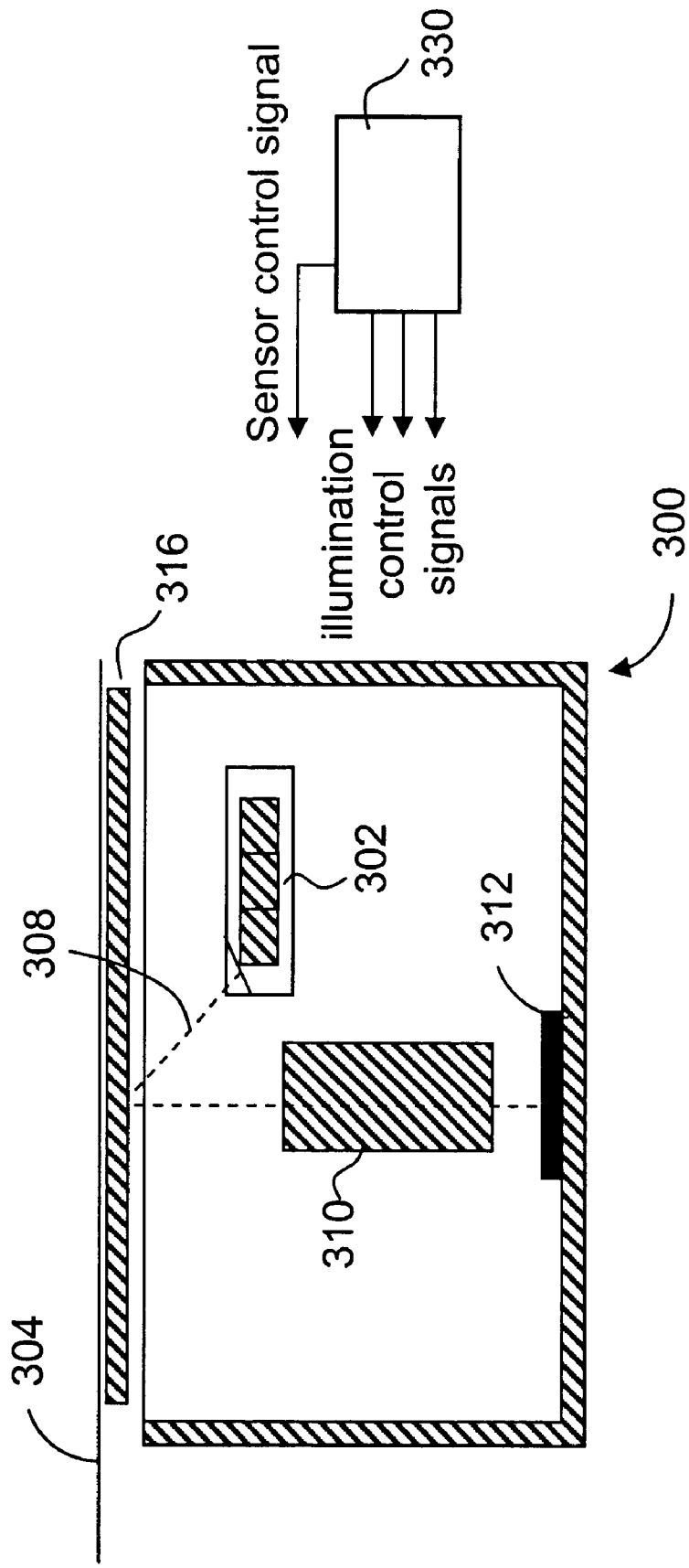

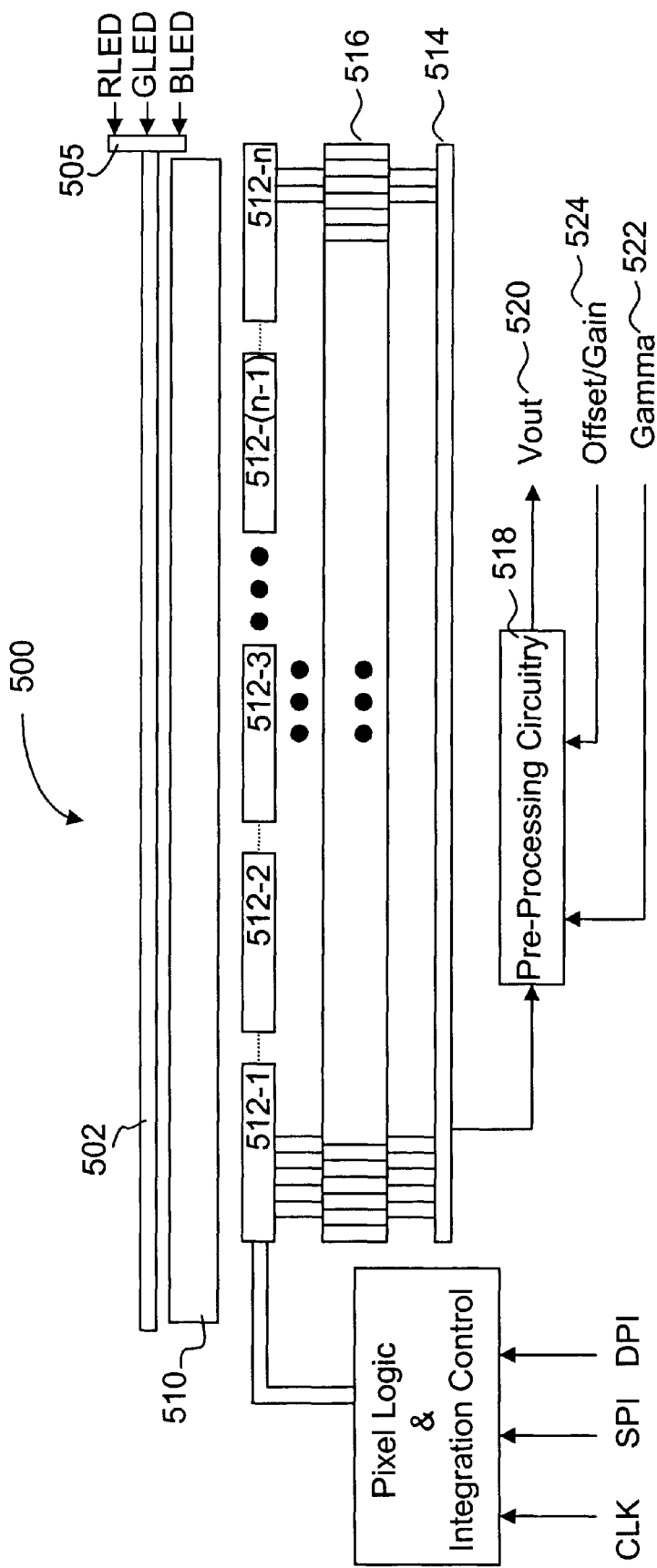

ADAPTIVE TIMING CONTROL OF LIGHT INTEGRATION PROCESS IN ONE-DIMENSIONAL CMOS IMAGE SENSORS

BACKGROUND OF THE INVENTION

1. Field of the Invention

The present invention generally relates to imaging systems and more particularly relates to an adaptive timing control of the light integration process of one-dimensional CMOS image sensors used in the imaging systems.

2. Description of the Related Art

There are many applications that need an imaging system to convert an object to an electronic format that can be subsequently analyzed, printed, distributed and archived. The electronic format is generally a black-and-white or color pixel image of the object. A typical example of the imaging system is a scanner and the object is generally a picture or a sheet of paper from an article. Through the scanner, an electronic or digital image of the picture or paper is generated and may be used to design World Wide Web pages.

An imaging system includes a sensing module that converts an object optically into an electronic image. Key components in the sensing module include an illumination source, an optical system and an image sensor. The illumination source provides illumination to the object being imaged. The optical system is used to collect and focus the incident light from the object onto the image sensor. The image sensor comprising a large number of photodetectors produces proportional electronic signals in response to the incident light. To reproduce colors of an object, it is known that at least three primary colors, typically red, green and blue, are needed. Analogously, colored lights such as red, green and blue lights are used in the illumination source of the sensing module. The three colored lights are turned on independently and successively so that the image sensor generates three intensity images, each with reference to one of the three colored lights.

The sensitivity (spectral response) of the image sensor to the colored lights, however, is not uniform. For example, a Complementary Metal-Oxide Semiconductor (CMOS) image sensor has a low sensitivity to the blue light but is highly sensitive to the red light. In addition, the luminance intensity of the green light is much stronger than the other two colored lights. Hence equal illumination parameters applied to all three colored lights have rarely considered because that would otherwise result in color biased images.

There have been many efforts to control the illumination parameters. A typical approach is to designate a set of different illumination timing parameters. For example, the illumination time for the blue light is made longer than that for the green light so that the image sensor gets exposed under the blue illumination longer than under the green illumination to produce equally strong intensity signals. Another typical approach is to have a set of different voltages (powers) applied to the three colored lights. For example, a weaker voltage is applied to the green light so as to produce a light to which the image sensor would have the same sensitivity as to the blue light. Besides using the different illumination parameters, some imaging systems further incorporate a compensation circuit or process to neutralize the resultant images due to the uneven sensitivity of the image sensor.

U.S. Pat. No. 5,729,361 to Suggs and Moayer discloses a combination of first providing a coarse adjustment by varying both the power provided to the lights (emitters) and the duration of the emitters/detector exposure time, and then providing a fine adjustment by storing a correction value for each of the photodetector elements. The method uses essentially a set of well controlled different illumination parameters to compensate the uneven sensitivity of an image sensor.

Having a set of controlled different illumination parameters typically demands a supporting circuitry to produce a number of illumination control signals with different characteristics, each controlling one of the lights. Besides the supporting circuitry could be complicated depending on the lights and other control factors, the set of controlled different illumination parameters often requires the image sensor to work precisely with the lights, which can be difficult under a shared bus environment. The bus, such as a PCI bus in a host computer, is a shared resource (bus) which many components and peripheral devices are coupled to for communications with the host computer. These components and peripheral devices then must arbitrate for the mastership of the bus, which inevitably introduces latency associated with the image data being transmitted over the bus. With the controlled different illumination parameters, the latency can cause the image sensor overexposed due to excessive illumination resulting from the delay of the bus. There is therefore a great need for an approach that results in a simple control of the lights and, more importantly, an adaptive timing control of the light integration process in the image sensor to produce balanced images in any conditions.

SUMMARY OF THE INVENTION

The present invention has been made in consideration of the above described problems and needs and has particular applications in imaging systems, such as image scanners, copy machines and facsimile machines, that optically convert an object to a signal or image before other processes can be proceeded.

An imaging system includes a sensing module that converts an object optically into an electronic image. Key components in the sensing module include an illumination source, an optical system and an image sensor. According to one aspect of the present invention, the illumination source comprises a high intensity light source that may be a fluorescent light or a light pipe excited by one or more light-emitting diodes (LEDs) and is typically turned on all the time for stabilization of the light for high-speed imaging applications. To avoid the image sensor being overexposed, a sensor control signal traditionally controlling the operation of the image sensor includes additional adjustable timing parameters that ensure a light integration process in the image sensor is proceeded only for a predefined time regardless how long the image sensor is exposed to the illumination source. This guarantees that images generated are not subject to irregular imaging cycles due to various delays in the imaging system.

In the case of color imaging, the illumination source comprises at least three colored light groups, each preferably having one primary colored lights. According to the invention, a control signals circuitry provides illumination control signals with illumination parameters independent of the sensitivity of the image sensor, each controlling one of the colored light groups. The illumination-parameters may include predetermined exposure time intervals and powers. Each of the predetermined exposure time periods (intervals) controls the exposing time for which a colored light group applied by one of the powers is kept on. Those skilled in the art may appreciate that the use of illumination control signals with predetermined but non-controlled illumination parameters is a radical shift from the prior art systems using controlled illumination parameters to compensate for non-uniform spectral responses of the image sensor. Using predetermined but non-controlled illumination parameters significantly simplifies designs related to the illumination controls.

According to another aspect of the present invention, the present invention uses one sensor control signal to control the operation of the image sensor and particularly each of the light integration processes thereof so as to compensate for non-uniform spectral responses of the image sensor. This is achieved by using a sensor control signal comprising sequential sensing signals, each responsible for one light integration process under one colored light group. Further each of the sensing signals has a dynamically adjustable timing parameter adaptively to the spectral responses of the image sensor under a specified colored illumination so that the respective light integration process is always proceeded for a predefined time.

According to still another aspect of the present invention, the timing parameters for the sensing signals in the sensor control signal are determined or obtained by recursively comparing a set of test signals with a reference using adjusted timing parameters in the respective light integration processes. In this way, the commonly seen color biased problems in color imaging are minimized.

There are numerous benefits and advantages of having a sensor control signal to control the light integration process of a sensor and illumination control signals with predetermined pararmeters. Accordingly, one of the objects of the present invention is to provide an approach that results in a simple control of the illumination source and, more importantly, an adaptive timing control of the light integration process in the image sensor to produce balanced images in many irregular conditions.

Other benefits and advantages, together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2 illustrates a scanner application employing the present invention and working in conjunction with a host computing system;

FIG. 3 illustrates a cross-section view of an image sensing module that can be used in the scanner of FIG. 2 to facilitate the description of the present invention;

FIG. 5 shows an internal functional diagram of the sensing module operable under the control signals in FIG. 4;

DETAILED DESCRIPTION OF THE PREFERRED EMBODIMENTS

Figure 1:
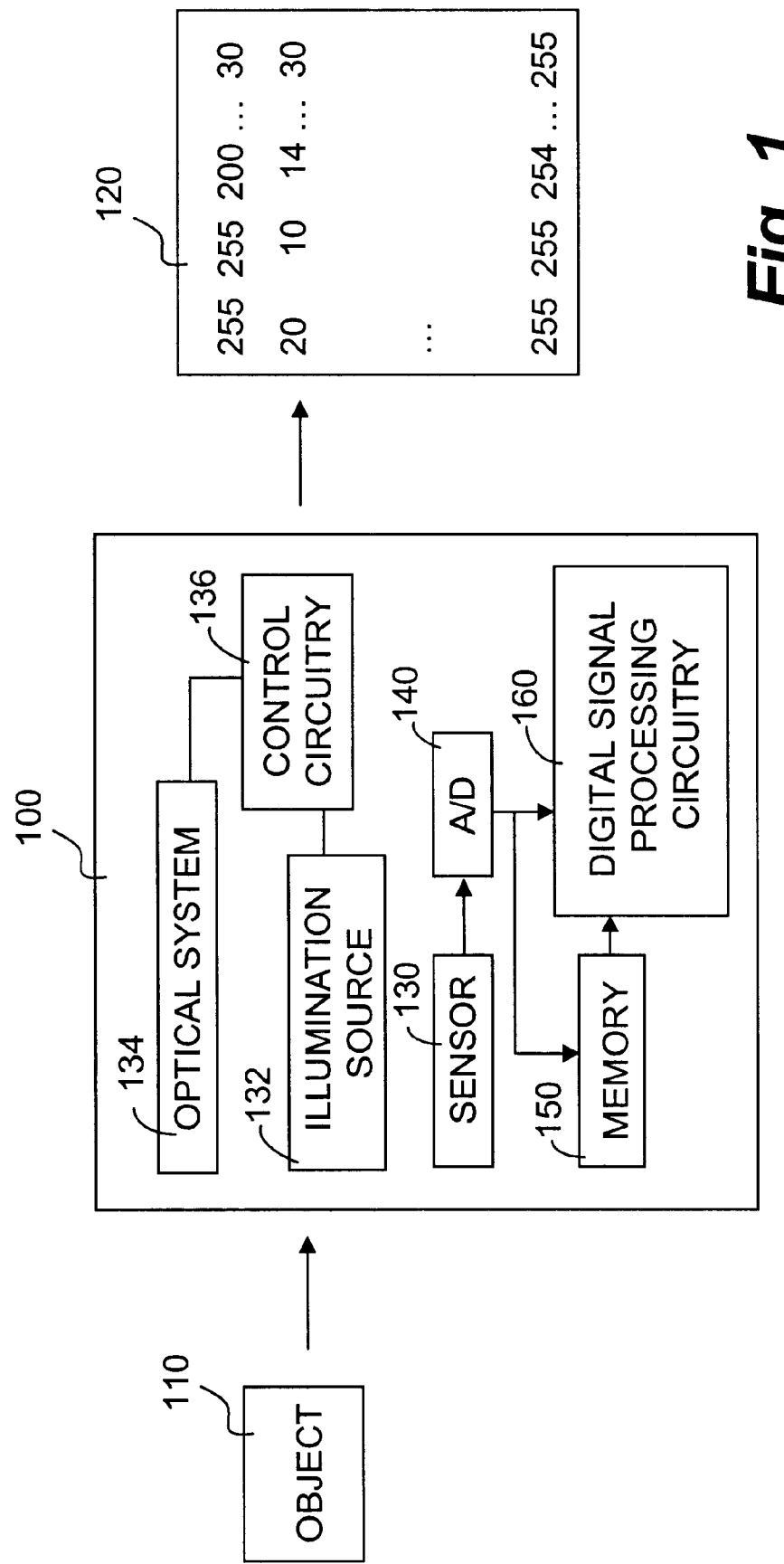
FIG. 1 depicts a schematic diagram showing an imaging system using image sensing module comprising an image sensor, an illumination source and an optical system along with other circuits to subsequently produce digital images.

Referring now to the drawings, in which like numerals refer to like parts throughout the several views. FIG. 1 shows a systematic diagram of an imaging system 100 in which the present invention may be applied thereto. Depending on the applications, imaging system 100 may be a color or black-and-white imaging system that includes, but not be limited to, a scanner, a copy machine, or a facsimile machine in which object 110 is optically scanned sequentially to generate an electronic image 120.

In the case of a monochrome scan, image 120 comprises a plurality of pixels, each pixel represented by a numerical value representing the intensity of incident light impinged upon an image sensor in imaging system 100 from a corresponding dot in object 110. For example, object 110 is an 8.5 inch by 11 inch paper; resultant image 120 has a size 850 by 1100 pixels and is represented in 8-bit format having a digital value ranging from 0 to 255. This means that each square inch of scanning object 110 is represented by 100 by 100 pixels. If all the pixels in the square inch are 255, the corresponding square inch in object 110 is white. Conversely if all the pixels in the square inch are 0, the corresponding square inch in object 110 is dark. It can be understood that any pixels having a value between 0 and 255, i.e. the gray scale, represent the variations of contents in object 110.

When imaging system 100 can reproduce colors, image 120 from imaging system 100 typically comprises three intensity images 120 respectively produced under, preferably, three primary colored illuminations, each of the intensity images being an array or matrix of pixels having a value between 0 to 255 if presented in an 8-bit precision. To be specific, each color pixel C(i, j) in color image 120 is a vector pixel that may be expressed as follows:

$$C(i, j) = \begin{bmatrix} R(i, j) \\ G(i, j) \\ B(i, j) \end{bmatrix}$$

where (i, j) are coordinates of an image pixel and C refers to color image 120 and R, G and B are the respective three intensity images in color image C 120. If a cluster S of corresponding pixels in each of the three intensity images have an identical value, namely R(i, j)=G(i, j)=B(i, j), where (i, j) is within S, a spot in object 110 corresponding to the cluster S must be colorless, visually somewhere from dark to white. Conversely if the cluster S of the pixels in each of the three intensity images have different values, i.e. R(i, j)≠G(i, j)≠B(i, j), the spot in object 110 corresponding to the cluster S should be visually colorful. For example, a pure red, green or blue vector pixel are expressed as C(i, J)=[255

$0\ 0]^T$, $C(i, j)=[0\ 255\ 0]^T$ or $C(i, J)=[0\ 0\ 255]^T$, respectively. To ensure that object 110 can be exactly reproduced in a color image, a color imaging system must be carefully controlled to produce the intensity images that can be combined to reproduce the colors of object 110 in the resultant color image.

It is generally understood, regardless the actual applications, imaging system 100 comprises a one-dimensional CMOS image sensor 130, an illumination source 132 and an optical system 134. When imaging system 100 is for black-and-white scanning applications, illumination source 132 typically comprises a full-white fluorescent light or high-intense green light and is kept on through the entire scanning cycle. When imaging system 100 is for color imaging applications, illumination source 132 comprises at least three colored lights, typically three primary colored lights that may be implemented with one or more red, green and blue light-emitting diodes (LEDs) or a full-white light source with separate colored filters, such as red, green and blue filters, to equivalently produce three colored lights. Object 110 is illuminated independently and successively by each of the three colored lights in an imaging cycle. Each of the three colored lights is respectively controlled by an illumination control signal from control circuitry 136. Optical lens or system 134 collects image light from object 110 and focuses the image light onto image sensor 130. As used herein, image light or incident light means either reflected light from (opaque) object 110 illuminated by a front illumination source or the transmitted light from (transparent) object 110 illuminated by a back illumination source. Both front illumination source and back illumination source are collectively referred to as the illumination source unless otherwise specified.

Image sensor 130 comprising a plurality of photodetectors is fabricated out of Complementary Metal-Oxide Semiconductor (CMOS) and configured as a one-dimensional array, referred to as a one-dimensional or alternatively linear sensor. The photodetectors are highly sensitive to light and each produces a proportional electronic signal with respect to the strength of the incident light. Optical lens 132 collects the image light from object 110 and focuses the image light upon image sensor 130, thereby the image light is imprinted onto image sensor 130 that generates a signal thereof.

The operation of image sensor 130 comprises two processes, the first being the light integration process and the second being the readout process, each sustaining for a controlled time interval. In the light integration process, each photodetector is initiated to accumulate incident photons of the image light and the accumulation is reflected as an electronic (discharge) signal. After the light integration process, the photodetectors start the readout process during which the electronic signal in each photodetector is sequentially readout as an analog signal, via a readout circuitry, to a data bus or video bus. It should be understood that the light integration process is occurred for each of the colored lights so that three light integration processes resulting in three readout processes produce three analog image signals per an imaging cycle if there are three colored light groups in the illumination source 132.

Coupled to the data bus, there is an analog-to-digital (A/D) converter that digitizes the analog signals to produce digitized signals that can be appropriately and subsequently stored in memory 150. Typically imaging system 100 further comprises a digital signal processing circuitry 160 that, depending on the use of imaging system 100, may adjust, correct, preprocess and compress the digitized signals to eventually output a digital image.

According to one configuration, the digital image data is generally transmitted to a host computer via a common bus that is a shared resource to which other components and peripheral devices are coupled for communications with the host computer. These components and peripheral devices often arbitrate for the mastership of the bus, which inevitably introduces latency associated with the image data being transmitted over the bus to the host computer. Therefore the light integration process in the image sensor does not necessarily happen as periodically as expected. Typically, due to the latency, the readout process can be severely delayed and the next imaging cycle could not be started until the current readout process is completed. If the timing to start the light integration process of the image sensor is not adaptively controlled and continues to proceed periodically, possible excessive illumination could cause the image sensor overexposed in the following imaging cycle. Apart from the prior art systems, the present invention uses an adaptive timing control of the light integration process of the image sensor using a single sensor control signal.

To facilitate the discussion of the present invention, the following description is primarily based on a color scanner application. Those skilled in the art will appreciate that the description herein can be applied equally well to other imaging systems in which an illumination source is used to produce intensity images in accordance with each of the colored lights in the illumination source.

FIG. 2 shows the scanner application that can employ the current invention. Scanner 200, corresponding to imaging system 100 of FIG. 100 is connected, through a communication cable 212 to computing device 202 that may be an IBM PC or PC-compatible notebook computer operating under a windows operating system, for example, Microsoft Window 98.

Scanner 200, preferably controlled by a control process executing in computing device 202, scans a scanning material 210, such as a piece of paper or film with text and graphics thereon. The control process, as will be described below, causes the scanning result to be transferred to computing device 202 through communication cable 212 coupled to a shared bus in computing device 202. The scanning result, generally a digital image comprising lines of digital signals, may be manipulated for desired visual effects by an application program, such as PhotoShop 5.0 from Adobe Systems, Inc. The digital image or manipulated digital image can be displayed on display monitor 104.

Computing device 202 is further provided a memory and a storage device, both not shown in the figure, for storing code for the control process and storing image files and application program files, respectively, a keyboard 206 for permitting input of text data, such as titles and names for scanned image files, and a pointing device 208 such as a mouse or the like which is also provided to permit execution of commands, for example, to display the scanned and manipulated images on display monitor 204.

Referring now to FIG. 3, there is shown a cross section view of a typical sensing module 300 that may be used in scanner 200 of FIG. 2. An illumination source 302 generally comprises a full white or single colored light source for black-and-white scanning or at least three different colored light groups for color scanning and provides illumination to scanning object 304 over a cover glass 306. Scanning object 304 may be a sheet of paper placed face down on cover glass 306 such that the scanning side is illuminated by illumination source 302. Cover glass 306 is transparent and provides a focus means for scanning object 304 to be properly scanned.

When illumination source 302 emits light onto scanning object 304 as indicated by 308, the light reflected from scanning object 304 through cover glass 306 is directed at an optical lens 310 that is generally an array of one-to-one erect graded index micro (cylindrical or rod) lens. It should be understood that the present invention is independent of the optical lens and the nature of light sources in illumination source 302. The use of the particular light source and the lens array in this configuration is to facilitate the description of the present invention and implies no limitation thereof.

Under optical lens 310, there is an image sensor 312 comprising an array of CMOS photodetectors. Optical lens 310 collects the reflected light onto image sensor 312 (the photodetectors) that converts the reflected light to electronic signals proportionally representing the intensity of the reflected light. The electronic signals are then transferred to a data bus, not shown in the figure, to start the readout process.

For scanning object 304 over the cover glass 306 to be completely scanned, scanning object 304 and the image sensor 312 have to move against each other. In the flatbed scanners, scanning object 304 is held still while the image sensor is driven by a motion mechanism to move along scanning object 304 at a fixed speed. In sheet-fed scanners, sensing module 300 is held still and scanning object 304 is rolled along sensing module 300 by a motion mechanism at a fixed speed. The moving speed is conformed to the image vertical resolution in the resultant image and hence synchronized by a system clocking signal.

In either case, a line of scanning object 304 is being scanned. After one line is scanned, scanning object 304 is advanced one scan line by the motion mechanism. The actual moving distance depends on the vertical resolution. When a color image is generated, illumination source 302, preferably comprising three light groups, each being red, green or blue LEDs, emits three different colored lights. The three groups of LEDs are respectively controlled by illumination control signals from control signals circuitry 330 and each of the light groups is turned on respectively and successively. For example, the red light is directed at scanning object 304 and the reflected light is focused onto the image sensor 312 by optical lens 310. Image sensor 312 integrates the reflected light and generates a sequence of electronic signals, each representing a pixel value. The pixels are then sequentially readout to the data bus. After the scanning process for the red light is finished, the same process is repeated respectively for the green light and blue light.

Figure 4A:
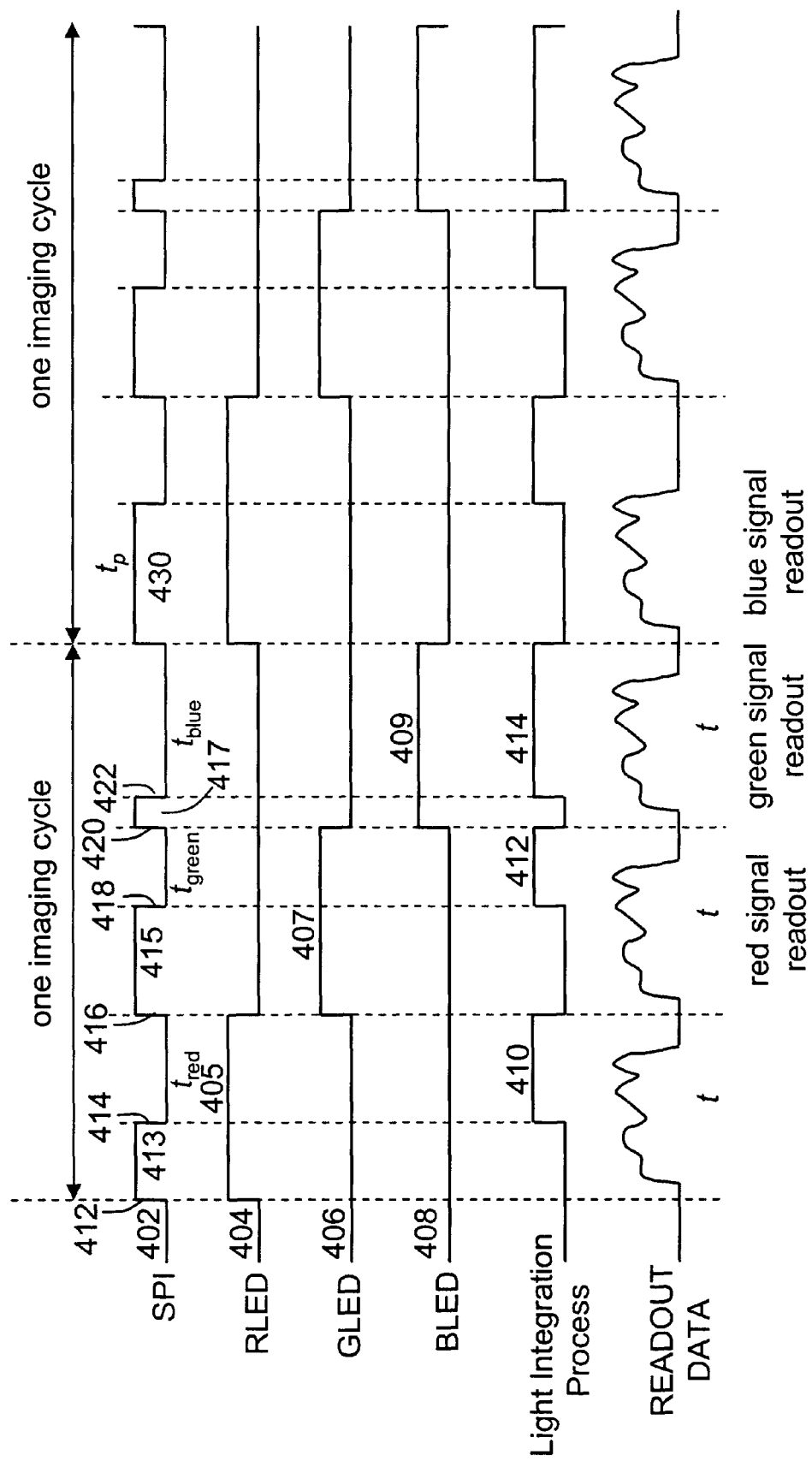
FIGS. 4A and 4B depict respectively a sensor control signal with the timing parameters adjustable to ensure that each of the light integration processes is lasted exactly for a predefined time interval.

According to the principles of the present invention, FIG. 4A shows a sensor control signal 402 and a set of illumination control signals (R) 404, (G) 406 and (B) 408 from control signals circuitry 330 of FIG. 3. According to one embodiment, illumination control signals 404, 406 and 408 are designed to have illumination parameters that are simply in synchronization with the operation of the image sensor. For example, the exposure time t for each of Illumination control signals 404, 406 and 408 is irrelevant to the color of the lights and the spectral sensitivity of the image sensor and turn-on magnitude (power) 405, 407 or 409 applied to the respective LEDs is respectively maintained unchanged. The simplicity of the simple illumination parameters results in simple design of control signals circuitry and simple control of the illumination source. To be more specific, unlike in many prior systems, illumination control signals 404, 406 and 408 herein are not controlled with respect to the illumination intensity and/or spectral response of the image sensor. It can be appreciated by those skilled in the art that it is indeed not trivial to employ the uncontrolled illumination control signals in an image sensing module.

Importantly and fundamentally apart from prior art systems, sensor control signal 402 comprises a number of parameters. According to one implementation, sensor control signal 402 comprises three sequential sensing signals 413, 415 and 417 in each imaging cycle. An imaging cycle in color imaging means that a set of intensity signals is respectively generated under the illumination of each of the colored lights. In particular, rising edge 412 of first sensing signal 413 starts a new imaging cycle. RLED control signal 404 turns on the red LEDs first to illuminate a scanning object, the image sensor is not started for light integration process 410 till falling edge 414 arrives and light integration process 410 lasts for a predefined time interval $t_{red}$. The timing control of light integration process 410 is important, as the light integration process is independent of the exposing time of the (red) illumination. In other words, no matter how long the illumination is triggered on, the image sensor never gets overexposed because the light integration process lasts only for the predefined time interval. Further, red light integration process 410 stops when the next rising edge 416 of second sensing signal 415 arrives. Rising edge 416 starts GLED control signal 406 that turns on the green LEDs to illuminate the scanning object. Meanwhile the readout process for the image signal generated under the red illumination starts. At the falling edge 418, green light integration process 412 starts. Again when rising edge 420 arrives, green light integration process 412 stops, the readout process of the image signal generated under the green illumination starts, the green LEDs are turned off, and the blue LEDs are turned on. Blue light integration process 414 does not start till falling edge 422 arrives.

It should be pointed out that the order of sensing signal 413, 415 and 419 in sensor control signal 402 does not affect the operation of the present invention, nevertheless, adjustable timing parameters in each of the sensing signals is one of the key features in the present invention. In other words, each of the adjustable timing parameters controls the timing to start the respective light integration process to ensure that the light integration process lasts for a predefined time interval, e.g. $t_{red}$, $t_{green}$, and $t_{blue}$. In case, the image sensor could not be started for the next light integration process due to various reasons, one of the sensing signals will be caused by the respective timing adjustable parameter to delay the light integration process as shown in second imaging cycle 430. $t_p$ in sensor control signal 402 is so extended that the red light integration process is not started until it is guaranteed to last just for $t_{red}$ before another one of the colored lights is turned on.

Figure 4B:
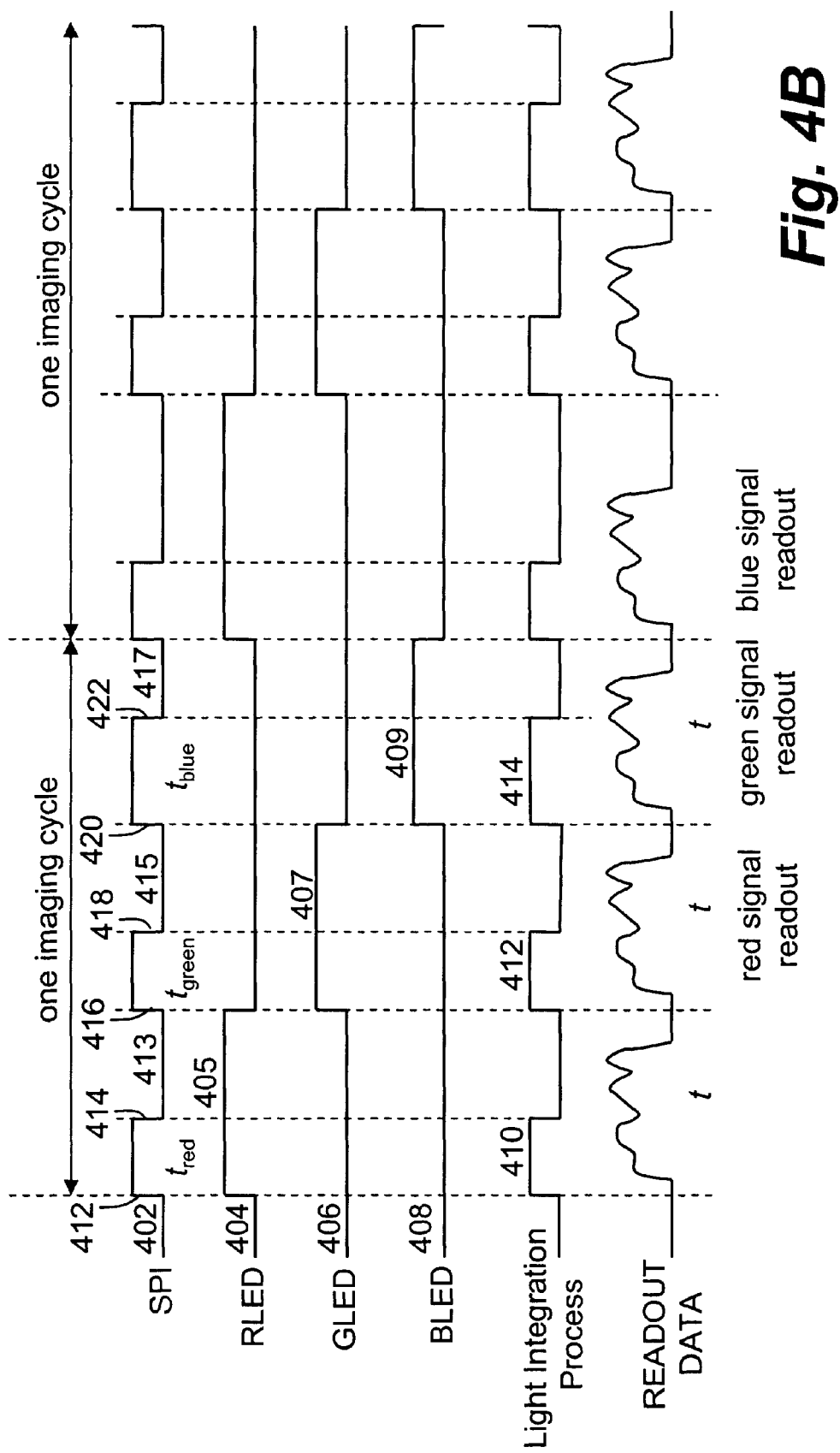

FIG. 4B shows another possible sensor control signal 402 in which a light integration process starts first for a predefined time interval, e.g. $t_{red}$, $t_{green}$, and $t_{blue}$. After the predefined time interval, the light integration process stops no matter how long the illumination source is kept on. The above description of FIG. 4A can be applied equally here to understand FIG. 4B.

Figure 4C:
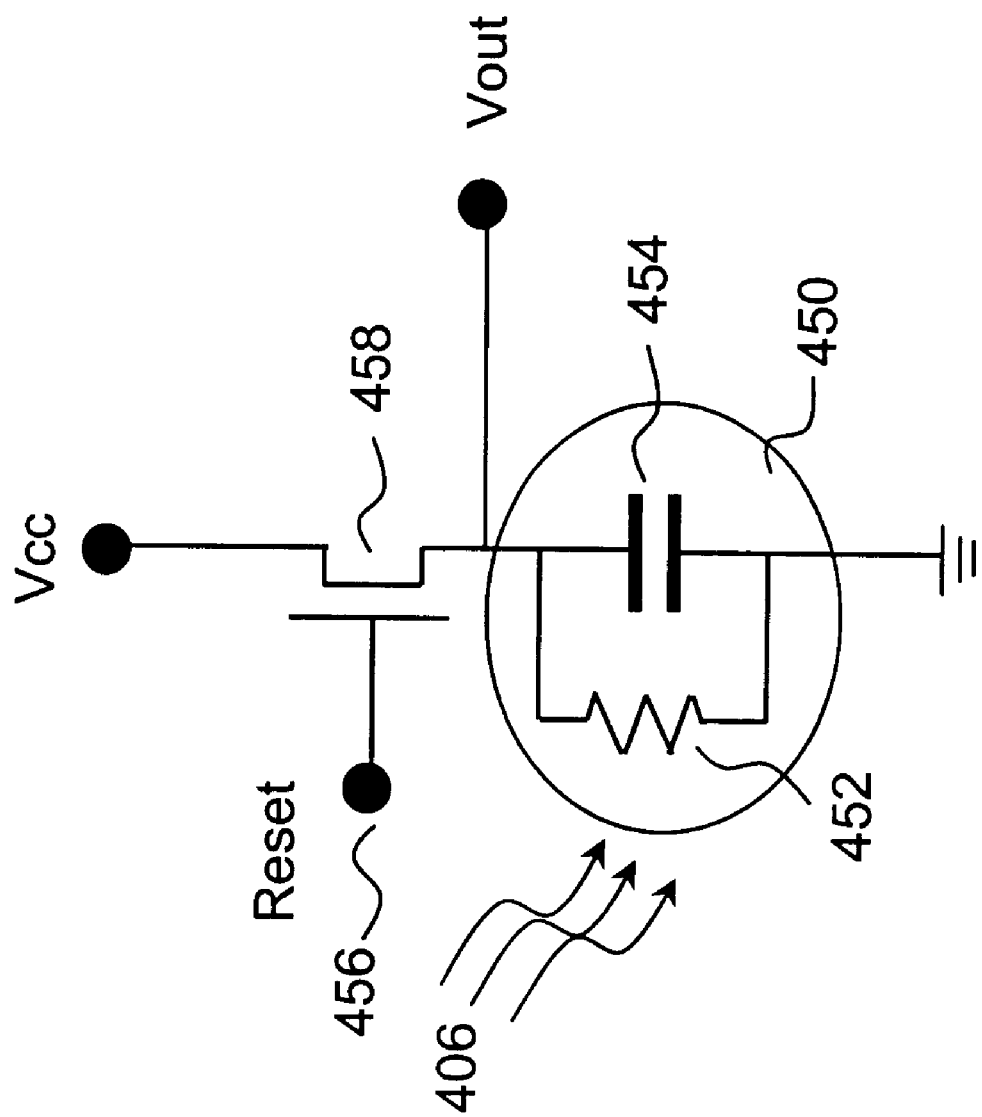
FIG. 4C shows a CMOS photodetector that is depicted as a photodiode and can be simply modeled as a resistor and a capacitor.

It is understood that CMOS sensors operate differently from other types of sensors. FIG. 4C shows a CMOS photodetector that is depicted as a photodiode and can be simply modeled as a resistor 452 and a capacitor 454. When a reset signal is applied at "Reset" 456, capacitor 454 is fully charged by Vcc through transistor 458, which means that photodetector 450 is ready for light integration (the charge by Vcc to capacitor 454 is stopped). As soon as the rest signal is dropped, the light integration starts. As more and more incident photons from light 406 come to photodetector

450, the resistance of resistor 452 decreases. Capacitor 454 starts to discharge through resistor 452. Typically, the higher the photon intensity is, the more photons a photodetector collects, and hence the smaller resistance resistor 452 has, consequently a faster discharge signal Vout yields. In other words, the signal from Vout is proportional to the photons came to the photodetector and referred to an electronic signal herein alternatively.

Sensor signal 402 of FIG. 4A or 4B may be applied collectively on "Reset" 456 of all the photodetectors. As long as one of the sequential sensing signals 413, 415 and 417 is on, the light integration process will not start. Once the one of the sequential sensing signals 413, 415, and 417 is dropped, the light integration process starts.

Those skilled in the art may appreciate that the use of sensor control signal 402 to control the operation of the image sensor and the respective light integration processes so as to compensate the uneven sensitivity of the image sensor and the uneven intensity of the colored light sources is a radical shift from the prior art systems. There are numerous benefits and advantages of this design besides easier control of the illumination source. Even in black-and-white imaging in which the illumination is typically on all the time, the timing control of the light integration process in the sensor control signal avoids the image sensor being overexposed when the image sensor is paused by a sloweddown readout process.

FIG. 5 shows an internal functional diagram of a sensing module 500 operable under the control signals in FIG. 4A or FIG. 4B according to one embodiment of the present invention. Light pipe 502 is excited by illumination source 505 that may comprise a red LED, a green LED, and a blue LED, each controlled respectively by a control signal, GLED, RLED or BLED. The LED control signals GLED, RLED or BLED may correspond respectively to illumination control signals 404, 406 and 408 in FIG. 4A.

A Lens 510, typically a rod lens array, collects image light from a scanning object illuminated by illumination source 505 and focuses the incident light onto image sensor 512 underneath. Image sensor 512 comprises a number of individual linear sensors, each having a large number of photodetectors. For example, image sensing module 500 is designed to image scanning objects at 600 dots per inch (dpi) and one linear sensor comprises 512 photodetectors, then there are 10 such linear sensors in image sensor 512. Each of the photodetectors collects the incident light cast thereon during each of the light integration processes controlled by a sensor control signal SPI and subsequently generates an electronic signal. Upon the completion of each of the light, integration processes, the electronic signals are sequentially readout to the video bus 514 as a scanning signal via readout switch array 516. Switch array 516 preferably comprises the same number of the readout switches as the number of the photodetectors in image array 512. It is understood to those skilled in the art that each of the readout switches may be implemented by a diode that becomes on or "passing through" when a signal (from the sensor control signal) is applied across. As shown in the figure, the scanning signal is coupled to a preprocessing control circuitry 518 that subsequently produces a video signal Vout 520. The scanning signal is processed, including amplified and offset, in the preprocessing control circuitry 518 with respect to a desired adjustment gamma control 522 and offset/gain 524.

Figure 6:
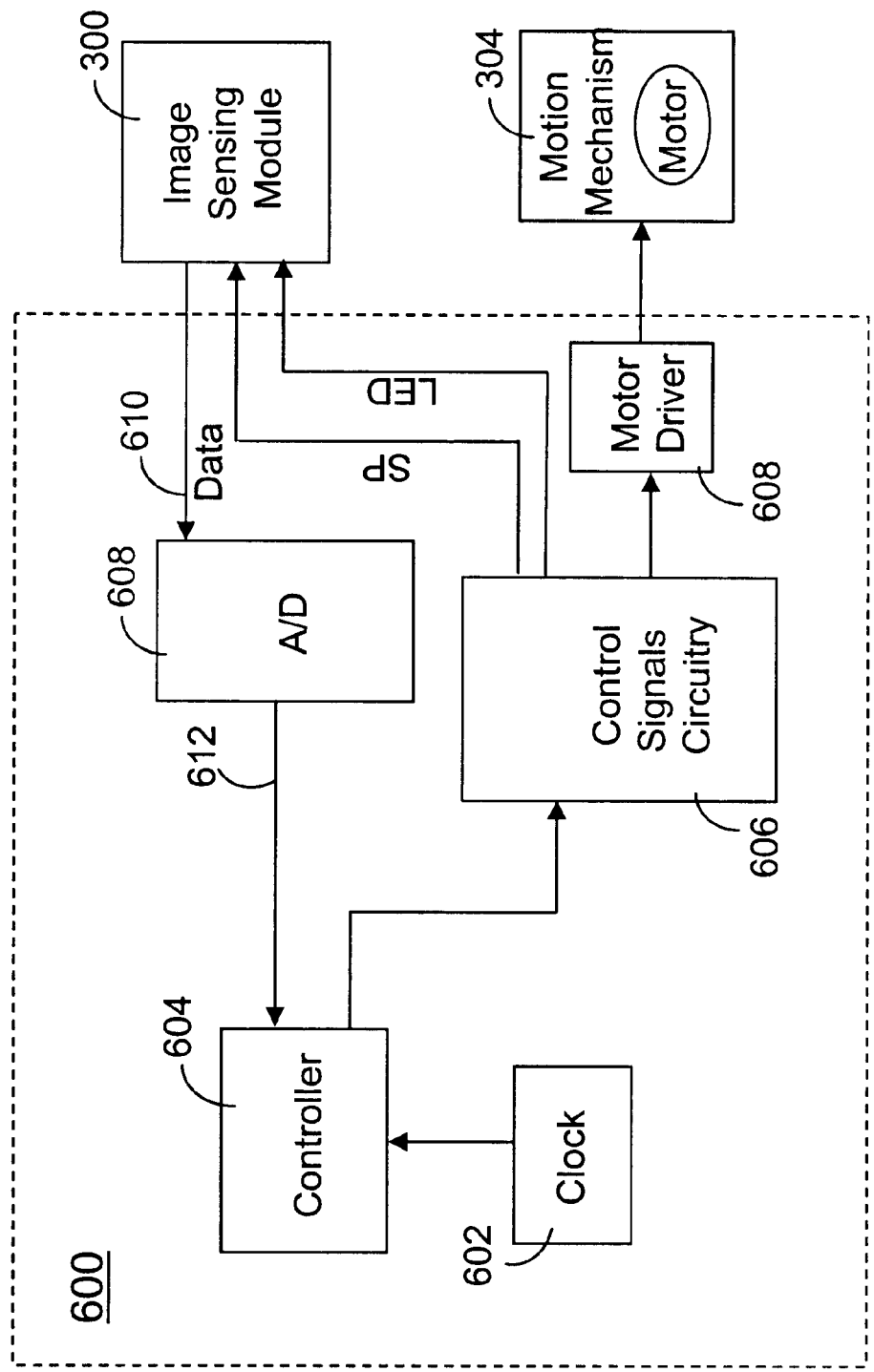
FIG. 6 shows one embodiment of the control signals circuitry that generates the sensor control signal and the illumination control signals.

FIG. 6 shows one embodiment 600 of generating the control signals. Clock 602 provides a clocking signal from which a microcontroller 604 derives a set of control signals to control all the parts to work in concert. Microcontroller 604 that may be a microprocessor 68HC320 from Motorola Inc. or an application specific integrated circuit (ASIC) typically coordinates with an overall system performance control signal. For example, if it is detected that a readout process is slowed down due to reasons in a host, Microcontroller 604 will alter the control signals to respond accordingly to ensure image sensing module 300 work in concert, for example, to increase the image cycle. Control signals circuitry 606 coupled to microcontroller 604 generates sensor control signal 402, and illumination control signals RLED 404, GLED 406 and BLED 408.

According to one embodiment, microcontroller 604 initially receives a set of test signals from the image sensor in image sensing module 300. The set of test signals may represent a line of a scanning object. Typically the marginal areas of a scanning object are uniform and often white and hence may be readily used to adjust the timing parameters of the sensing signals in the sensor control signal. Because illumination control signals RLED 404, GLED 406 and BLED 408 are predetermined, for example, synchronized as shown in FIG. 4A or 4B, the timing parameters (e.g. respective exposure time and voltage) for the sensing signals can be easily obtained.

A respective test signal is generated from the image sensor when one of the colored lights is turned on. As a result, three test signals are obtained when there are three colored lights in an illumination source. To achieve the white balance, the resultant color pixels, as described before, must have entries being identical. If microcontroller 604 detects that there are differences among the test signals, typically the test signal under the blue illumination is weaker, the differences microcontroller 604 cause control circuitry 606 to adjust the respective timing parameters for the sensing signals in a sensor signal. Then a new set of test signals is obtained with the sensor signal, the differences among the new set of test signals are then determined and to adjust the respective timing parameters again for the sensing signals. The calibration process is repeated recursively to derive subsequently a set of respective timing parameters till the differences among the test signals are less than a predefined threshold and to produce a sensor signal such as SP 402 shown in FIG. 4A or 4B.

Figure 7:
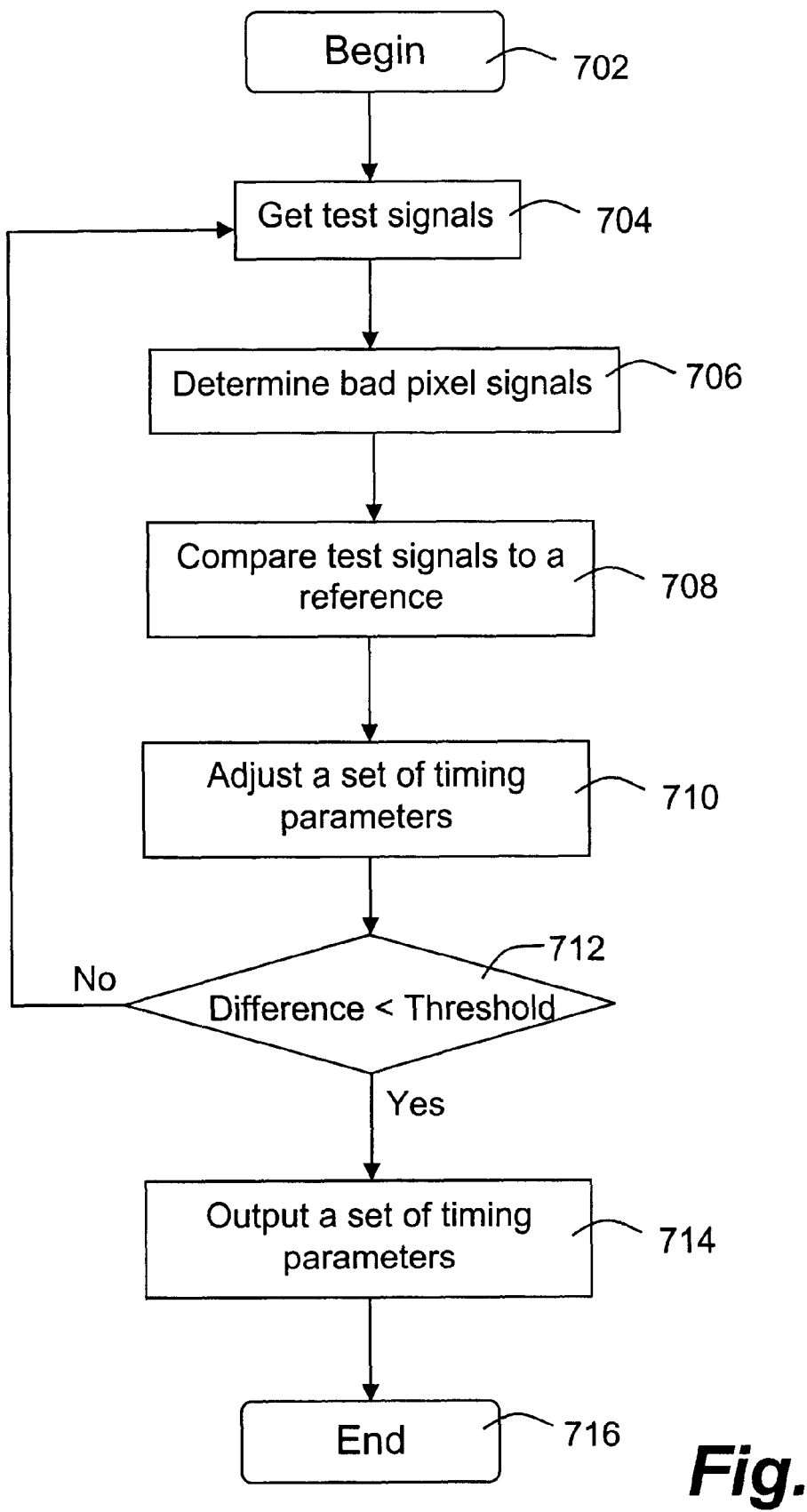
FIG. 7 shows a flowchart diagram of a process that can be executed to provide the adjustable timing parameters to an on-chip control circuit in an image sensor to generate the sensor control signal.

FIG. 7 shows a flow diagram of a process 700 to derive a set of respective timing parameters for the sensing signals according to another embodiment. Process 700 is preferably loaded into a memory and executed by a microprocessor of a computing system. It is commonly known that many imaging systems are operated with a computing system, for example, a scanner works typically in conjunction with a computer as shown in FIG. 2. The computer operates a scanner driver that controls the operation of the scanner and downloads scanned image data into a storage device. Process 700 is preferably included in the scanner driver and provides a set of respective timing parameters to a control circuitry to generate an appropriate sensor signal.

Process 700 starts with a set of test signals that are respectively obtained at 704 with each of the colored lights successively and independently turned on. To avoid bad signals that may result from poor performed photodetectors in the image sensor, one or more lines of scanning signals are acquired to detect if there are any bad signals in the acquired scanning signals at 706. Typically, If there are any digital signals that have values ±50% of the average of the entire line of digital signals, these pixels are marked "bad" and may be replaced by an average of the surrounding pixel signals. At 708, the set of test signals is compared with a reference that may have a specific value for each of the test signals under a certain condition. The respective difference between the test signals and the reference is used to adjust at 710 a set of respective timing parameters that subsequently affect the respective light integration processes. At 712, a new set of test signals is obtained under the respective light integration processes with the respective timing parameters. Recursively, the difference between a new set of test signals and the reference is eventually less than the threshold. At 714, the set of respective timing parameters is output to the control circuitry to create a sensor control signal compliant with the calibration process so as to produce balanced color images illuminated with colored lights of identical illumination parameters.

Figure 8A:
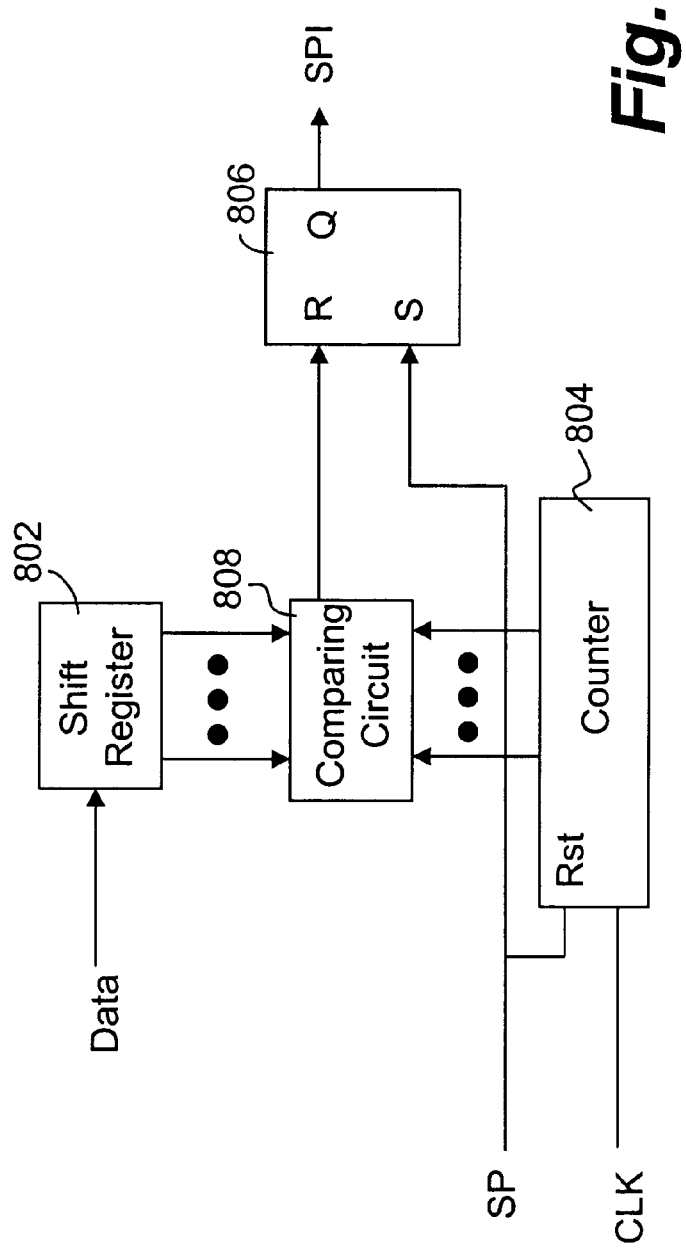
FIG. 8A illustrates a possible implementation of the on-chip control circuit using the outputs from FIG. 7 to control the operation of the image sensor.

FIG. 8A illustrates one possible implementation of the control circuitry 800 receiving the measurement results from a computing system that works together with a scanner. Control circuitry 800 receives the respective timing parameters from a host computer with which the scanner is operated. Based on the respective timing parameters, control circuitry 800 produces an appropriate sensor control signal that ensures that all respective light integration processes last respectively for a period determined in the calibration process in FIG. 7.

Figure 8B:
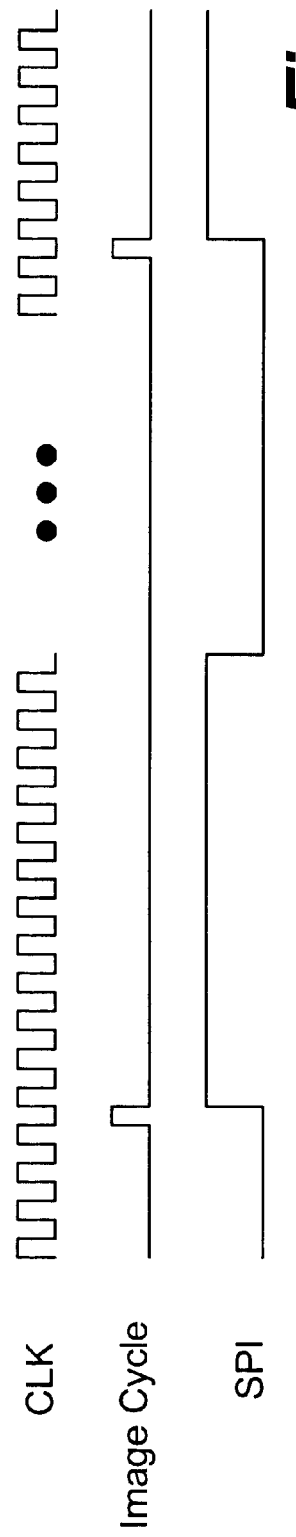
FIG. 8B shows a set of timing diagrams used in the on-chip control circuit.

In conjunction with FIG. 8B, shift register 802 receives the predefined period (data) information from the calibration process in FIG. 7, for example, 10 microseconds, represented as 00001011 in binary. Counter 804 is coupled to a clock signal (CLK) source and counts the pulses thereof. A starting pulse (SP) representing the image cycles arrives and resets both counter 804 and RS circuit 806. In one embodiment, the output SPI from RS circuit 806 is turned to high upon the arrival of the starting pulse. Meanwhile, counter 804 counts the clock signal (CLK), comparing circuit 808 outputs a signal as soon as counter 804 reaches a number that is equivalent to the data in shift register 802. The signal from comparing circuit 808 causes RS circuit 806 to change state, for example, from high to low. The sensor control signal is thus so generated and may be applied to the image sensor. It should be pointed out that control circuitry 800 is preferably fabricated together in the image sensor.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. For example, a single sensor control signal is used in one embodiment of the present invention, there could be embodiments in which several control signals function jointly to the equivalency of a single sensor control signal. Accordingly, the scope of the present invention is defined by the appended claims rather than the forgoing description of embodiments.

I claim:

1. An improved image sensing module comprising:
an image sensor comprising a plurality of photodetectors:
an illumination source;
a control signals circuitry providing a sensor control signal controlling a light integration process in which said image sensor images a scanning object to produce a signal thereof, said sensor control signal, applied to said photodetectors, adaptively maintaining a predefined time interval for said light integration process so that each of said photodetectors is ensured in said light integration process to produce a non-saturated electronic signal even if said illumination source is still on, wherein said sensor control signal includes a series of pulses, each of said pulses ensures that said light integration process lasts for said predefined time interval and does not start said light integration process till said predefined time interval finishes upon an arrival of a following pulse in said pulses.

2. The improved image sensing module as recited in claim 1, wherein said light intergration process is started upon said arrival of each of said pulses and lasted for said predefined time, regardless when said following pulse comes.

3. The improved image sensing module as recited in claim 1, wherein each of said pulses starts said exposing time of said illumination source.

4. The improved image sensing module as recited in claim 3, wherein each of said pulses does not come until said image sensor is ready for a next light integration process.

5. The improved image sensing module as recited in claim 4, wherein said illumination source is kept on all the time for stabilization of said illumination source.

6. The improved image sensing module as recited in claim 5, wherein said illumination source is a single-colored light source.

7. The improved Image sensing module as recited in claim 6, wherein said illumination source is a light pipe excited by a single-colored light source.

8. An improved image sensing module comprising:
an illumination source comprising n light groups, each of said n light groups producing a single-colored light;
an image sensor comprising a plurality of photodetectors; and
control signals circuitry providing a sensor control signal and n illumination control signals, said sensor control signal, applied to said photodetectors, comprising n sensing signals, each of said n sensing signals having an adjustable timing parameter that varies adaptively till said image sensor is ready for a respective light integration and ensures said respective light integration process in said image sensor, with respect to one of said n light groups, to image a scanning object for a predefined time to produce a signal of the scanning object regardless how long said one of said n light groups is on.

9. The sensing module as recited in claim 8, wherein each of said n illumination control signals has predefined parameters including an exposing time and a power applied to one of said n light groups in said illumination source.

10. The sensing module as recited in claim 9, wherein n is three and wherein said illumination source includes three primary colored lights, each producing illumination of one color.

11. The sensing module as recited in claim 10, wherein said three primary colored lights comprises at least one red light-emitting diode, one green light-emitting diode and one blue light-emitting diode; each of said at least one red light-emitting diode, one green light-emitting diode and one blue light-emitting diode is respectively controlled by one of said illumination control signals so that each of said at least one red light-emitting diode, one green light-emitting diode and one blue light-emitting diode is applied with said power and turned on for said exposure time.

12. The sensing module as recited in claim 8, wherein said predefined time interval for each of said sensing signals with respect to one of said colored light groups is generated from a signal measurement module receiving a test signal from said image sensor, said signal measurement module recursively adjusting said predefined time till said test signal is substantially close to a reference.

13. The sensing module as recited in claim 12, wherein said signal measurement module is code stored in a memory, a processor coupled to said memory and executing said code to cause said signal measurement module to:
- receive repeatedly said test signal obtained under said predefined time;
- compare said test signal collectively with said reference;
- adjust recursively said predefined time till said test signal is substantially close to said reference; and
- output said predefined time to said control signals circuitry.

14. The sensing module as recited in claim 12, wherein said control signals circuitry receives data of said predefined time from said signal measurement module and wherein said control signals circuitry comprises:
- a register receiving said date of said predetermined time from said signal measurement module;
- a counter receiving a clock signal and counting said clock signal when said counter is reset when said image cycle begins; and
- a comparing circuit coupled to said register and said counter and receiving said data from said register and a counter number from said counter, wherein said comparing circuit produces a trigger signal when said counter number from said counter reaches said data.

15. The sensing module as recited in claim 14, wherein said control signals circuitry further comprises:
- a gate circuit coupling to said comparing circuit and maintaining a first state, said first state changing to a second state upon receiving said trigger signal from said comparing circuit.

16. The sensing module as recited in claim 15, wherein said light intergration process is started when said second states starts after a time interval is elapsed for as long as said first state stays.

17. The sensing module as recited in claim 15, wherein said light integration process is started as soon as said first state begins; and said light integration process stops when said second state comes.

18. A method for keeping a light integration process of an image sensor with respect to an illumination source for a predetermined period, said method comprising:
- determining said predetermined period in a signal measurement module;
- receiving said predetermined period in control signals circuitry;
- generating a sensor control signal from said control signals circuitry with respect to said predetermined period; said sensor control signal comprising a timing parameter that can be adaptively adjusted so that said light integration process can last for said predetermined period no matter how long said illumination source is kept on; and
- activating said image sensor to image a scanning object in said light integration process during an imaging cycle to produce a signal of the scanning object.

19. The method as recited in claim 18, wherein said determining said predetermined period in a signal measurement module comprises:
- receiving repeatedly a test signal from said image sensor obtained under said predefined time;
- comparing said test signal collectively with a reference;
- adjusting recursively said predefined time till said test signal is substantially close to said reference; and
- outputting said predefined time to said control signals circuitry.

20. The method as recited in claim 19, wherein said control signals circuitry further produces an illumination control signal with a prefixed exposing time and a prefixed power applied to said illumination source so that said illumination source operates independently from characteristics of said image sensor and said illumination source.

21. The method as recited in claim 19, wherein said control signals circuitry is embedded in and coupled to said image sensor and wherein said control signals circuitry comprises:
- a register receiving data of said predetermined period obtained in a host computer;
- a counter receiving a clock signal and counting said clock signal when said counter is reset when said image cycle starts; and
- a comparing circuit coupled to said register and said counter and receiving said data from said register and a counter number from said counter, wherein said comparing circuit produces a trigger signal when said counter number from said counter reaches said data.

22. The method as recited in claim 21, wherein said control signals circuitry further comprises:
- a gate circuit coupling to said comparing circuit and maintaining a first state, said first state changing to a second state upon receiving said trigger signal from said comparing circuit; wherein said sensor control signal is output from said gate circuit.

23. The method as recited in claim 22, wherein said activating said image sensor in said light integration process to image a scanning object comprises:
- elapsing an time interval with respect to said first state; and
- starting said light integration process when said second states starts.

24. The method as recited in claim 22, wherein said activating said image sensor in said light integration process comprises:
- starting said light integration process as soon as said first state begins; and
- stopping said light intergration process when said second state comes.

* * * * *